United States Patent
Taylor et al.

[15] 3,699,184
[45] Oct. 17, 1972

[54] BLEND OF BLOCK COPOLYMER, ONE OF WHICH IS EPOXIDIZED

[72] Inventors: Glenn L. Taylor, Houston, Tex.; John W. Cotton, Palos Verdes Peninsula; De Loss E. Winkler, Orinda, both of Calif.

[73] Assignee: Shell Oil Company, New York, N.Y.

[22] Filed: June 16, 1071

[21] Appl. No.: 153,835

Related U.S. Application Data

[63] Continuation-in-part of Ser. No. 759,521, Sept. 12, 1968, Pat. No. 3,607,977.

[52] U.S. Cl. ............... 260/836, 260/876 B, 260/878, 260/880 B, 260/886
[51] Int. Cl. ...... C08g 45/04, C08f 15/00, C08f 19/00
[58] Field of Search ........................... 260/836, 880 B

[56] References Cited

UNITED STATES PATENTS 3,555,112   1/1971   Winkler.....................260/836
3,607,982   9/1971   Winkler.....................260/836

*Primary Examiner*—Paul Lieberman
*Attorney*—William R. Myers et al.

[57] ABSTRACT

Block copolymer compositions are provided comprising hydrocarbon block polymer containing at least two monoalkenyl arene blocks and at least one conjugated diene block or hydrogenated derivatives of said polymers, combined with a second block copolymer comprising at least one monoalkenyl polymer block and at least one epoxidized conjugated diene polymer block and hydrogenated derivatives thereof. These compositions are especially useful for such purposes as adhesion to polar surfaces, improvement in weatherability and high tensile strength.

5 Claims, No Drawings

BLEND OF BLOCK COPOLYMER, ONE OF WHICH IS EPOXIDIZED

This application is a continuation-in-part of application Ser. No. 759,521 filed Sept. 12, 1968 now Pat. No. 3,607,977.

BACKGROUND OF THE INVENTION

Block copolymers of monovinyl arenes, such as styrene, with conjugated dienes, such as butadiene or isoprene, have been studied in considerable detail during the past few years. Furthermore, hydrogenated derivatives of these have been prepared. A wide spectrum of these hydrocarbon polymers has been developed in which their physical properties are related to the molecular weights of the individual polymer blocks and, further, to the ratio of the thermoplastic blocks, e.g., polystyrene, to elastomeric blocks, e.g., polybutadiene, as well as to the number of blocks within any given polymer chain. Thus a range of products with properties varying from these of plastics to those of elastomers has been developed; more particularly a relatively restricted class of so-called thermoplastic elastomers has been studied. The latter term is meant to refer to block copolymers which exhibit the flow properties of thermoplastic materials above the softening points of both types of blocks but which at ambient temperatures exhibit the properties of high tensile strength rubber without having been subjected to vulcanization. These materials have been utilized in many commercial applications but due to their entirely hydrocarbon nature they exhibit certain physical characteristics which it would be desirable to alter or enhance. Thus, the adhesion of these hydrocarbon polymers to polar or metal surfaces has sometimes been less than desirable. Moreover, it has been noted that due to the residual unsaturation in the conjugated diene portion of the block polymer they are subject to oxidation and degradation in the presence of air or light.

OBJECT OF THE INVENTION

It is an obJect of the present invention to provide improved block copolymer compositions having substantially increased polar character. It is a particular object of the invention to provide compositions containing both a hydrocarbon block copolymer and a block copolymer capable of imparting polarity to the composition. It is a further object of the invention to increase the adhesion of block copolymer compositions to polar surfaces. Other objects include promoting wettability by aqueous systems and weathering resistance. Other objects will become apparent during the following detailed description of the invention.

STATEMENT OF THE INVENTION

Now, in accordance with the present invention, novel block copolymer compositions are provided comprising 100 parts by weight of a non-polar block copolymer having at least two monoalkenyl arene polymer blocks and at least one conjugated diene polymer block and hydrogenated derivatives of said polymers and 1–100 parts by weight of a second block copolymer having at least one monoalkenyl arene polymer block and at least one epoxidized polybutadiene block wherein at least about 10 percent of the olefinic double bonds of the latter block are reduced by epoxidization, and hydrogenated derivatives thereof. Preferred compositions comprise blends of 100 parts by weight of a selectively hydrogenated non-polar block copolymer wherein at least 90 percent of the olefinic double bonds of the conjugated diene polymer block have been reduced by hydrogenation and also wherein the epoxidized block copolymer is one in which at least about 50 percent of the olefinic double bonds of the epoxidized diene polymer block have been reduced by hydrogenation either before or after epoxidation.

One special aspect of the present invention lies in forming blends, preferably in solution, of the first block copolymer which is in the form of a living polymer, i.e., being associated with at least one alkali metal ion. This special type of composition when suitably treated such as by mild heating can result in coupling of the living block copolymer to the epoxidized second block copolymer by means of reaction with the epoxy radicals.

The first block copolymer which the compositions of the present invention are intended to modify is essentially a hydrocarbon block polymer which may be obtained by sequential block polymerization or by sequential polymerization incorporating a coupling feature. Thus the invention especially contemplates the use of block polymers having the general configuration

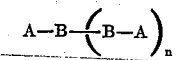

wherein $n$ is an integer from 1 to 5. When $n$ is 1 the structure is regarded as A-B-A. The blocks A comprise non-elastomeric polymer blocks of either alpha olefins or of monoalkenyl arenes such as styrene or alpha-methyl styrene, while the amorphous B blocks comprise alpha-olefin copolymer or elastomeric conjugated diene polymer or copolymer blocks such as those derived from butadiene or isoprene. Hydrogenated polymers of the above types also are contemplated. The above general formula allows for linear polymers such as those having the configuration A-B-A, e.g., polystyrene-polybutadiene polystyrene and other multi-block linear structures such as $\mathrm{A-B-A(B-A)}_{1-5}$ or branched or non-linear or star-shaped counterparts thereof having more than three polymer blocks. Residues of monomeric coupling agents are ignored in these general formulas. Special coupling reactions may be utilized in the formation of the linear or non-linear species of this group of block copolymers such as

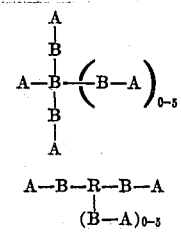

or

A—B—R—B—A
  |
  (B—A)₀₋₅ wherein R is a polymeric residue of coupling agent such as polyepoxidized polybutadiene. It will be understood that the invention contemplates not only compositions which capitalize upon the present possibility of thermoplastic elastomers but also upon the modification of such block copolymers having a sufficiently high monoalkenyl arene polymer block content to result in a block copolymer having the general properties of a high impact polystyrene or the like. This will depend in large measure on the relative proportions of the monoalkenyl arene polymer blocks. Preferably the blocks A comprise between 25 and 55 percent by weight of the non-polar block copolymer; such polymers will be found to have the general properties of a thermoplastic elastomer insofar as high tensile strength, high elasticity, and other stress-strain properties are concerned. Moreover, it is preferred, although not essential, that the non-polar block copolymers be confined to a preferred molecular weight range in each polymer block so as to promote processability of the compositions in which they are used. Thus, the preferred block copolymers for this purpose have polystyrene blocks with an average molecular weight each of between 4,000 and 50,000 (usually 12,000–30,000), while the conjugated diene polymer blocks have average molecular weights in the order of 20,000–250,000 usually 35,000–100,000 as determined by tritium counting methods.

The above type of block copolymer has the substantial and outstanding advantage of performing as a "thermoplastic elastomer." By this is meant a polymer which behaves like a normally vulcanized rubber at ambient temperatures but has the properties of a thermoplastic material above the softening points of both types of polymer blocks. Due to the hydrocarbon nature of this block copolymer, it is somewhat deficient in a number of aspects such as its ability to adhere to polar surfaces such as cellulosic textiles and the like and also is deficient in other respects for specialized purposes which require good weatherability and other desirable physical properties. The present invention is designed to overcome these special aspects.

It should be emphasized that the present invention does not rely upon the use of block copolymers having a specific macromolecular structure. Further, it will be understood that the possibilities of variation in the latter are great and may depend upon the number of polymer blocks involved and particularly upon the type of any coupling agents which may have been employed in the preparation of these copolymers. When certain coupling agents are employed, for example, such as dihaloalkanes or alkenes a linear type of coupled polymer results. However, when polyfunctional coupling agents such as silicon tetrachloride, a star-shaped polymer results. Furthermore, when coupling agents such as epoxidized diene polymers (including epoxidized block polymers or random or homopolymers), a coupled product may be obtained. All of these types are contemplated in the generic scope of the present invention with respect to both non-polar block polymer and the epoxidized block polymer. While the preferred block polymers have monovinyl arene polymer blocks having an average molecular weight between 12,000 and 30,000 these blocks may have a broader range such as between about 4,000 and 50,000. Moreover, the conjugated diene polymer blocks may have average molecular weights between about 20,000 and 250,000, although the preferred average molecular weights are between 35,000 and 100,000. These molecular weight limitations are based upon determinations made by tritium counting methods.

The epoxidized block copolymer to be incorporated in the compositions of this invention is present in an amount between about one and 100 parts by weight per 100 parts by weight of the above described type of block copolymer. This modifiying epoxidized block copolymer is preferably prepared by epoxidation of a previously synthesized block copolymer containing at least one monoalkenyl arene polymer block and at least one conjugated diene polymer block. Still more preferably, the precursor block copolymer is one in which at least about 50 percent of the olefinic double bonds of the diene polymer block have been reduced by hydrogenation prior to epoxidation. Epoxidation may be effected by the use of known epoxidizing agents such as peracetic acid, hydrogen peroxide with acetic acid and sulfuric acid or with hydrogen peroxide and formic acid or other low molecular weight fatty acid. Inert hydrocarbons solvents such as benzene may be employed, utilizing epoxidation temperatures in the order of 25°–45° C for reaction times from 0.3 to 4.0 hours. When employing hydrogen peroxide and acetic acid together with a catalyst such as sulfuric acid the product is usually a mixture of epoxide and hydroxy ethoxy, while the use of peroxide together with formic acid results in diene polymer blocks containing both epoxide and hydroxy formoxy groups. While at least about 10 percent of the olefinic double bonds of the diene polymer block are eliminated by epoxidation, it is preferred that at least about 20 percent and up to about 75 percent of the double bonds be so eliminated.

It is a preferred aspect of the present invention to combine a non-polar block polymer which has been selectively hydrogenated to reduce at least 90 percent of the olefinic unsaturation in the conjugated diene polymer block especially when this is combined with an epoxidized block copolymer in which the epoxidized diene block has been hydrogenated to remove at least about 50 percent of its olefinic unsaturation. Under these circumstances, it has been unexpectedly found that the blends have a high degree of optical clarity indicating their unexpected and unpredictable compatibility. This is substantiated by the rheological properties of these blends, as will be illustrated in the example which follows.

A hydrocarbon block copolymer was prepared by known methods having the structure polystyrene-polybutadiene-polystyrene in which the polybutadiene block had 40 percent 1,2-structure. The block molecular weights were 10,000–50,000–10,000. This precursor block polymer was hydrogenated by known methods to eliminate substantially all of the olefinic unsaturation in polybutadiene block. A second block copolymer having the structure polystyrene-polybutadiene-polystyrene wherein the polybutadiene block had 37 percent 1,2-structure. The block molecular weights were 15,000–68,000–14,000 as determined by tritium counting methods. This block polymer was hydrogenated by known methods from its original iodine number of 330 to an iodine number of 92 g iodine per 100 g polymer, indicating reduction of about 72 percent of the olefinic double bonds. The partially hydrogenated block polymer was then epoxidized with peracetic acid at 35° C for 3.5 hours.

The solution for epoxidation consisted of 151 grams of block copolymer in 1616 grams of cyclohexane. Epoxidation was effected with 218 grams of 37.5 percent peracetic acid added over a 2 hour period. After additional heating at 35° C the acid was neutralized with 200 grams of anhydrous sodium acetate which was then removed by filtration. The polymer was precipitated in isopropyl alcohol and had an epoxy value of 0.163 equivalents per 100 grams and an iodine number of 46 grams iodine per 100 grams polymer. This indicates that about 14 percent of the olefinic double bonds of the polybutadiene block had been eliminated by epoxidation. 100 parts by weight of the hydrocarbon block polymer were blended with 50 parts by weight of the epoxidized block polymer. The blend had the following properties:

| | |
|---|---|
| Tensile strength at break, psi | 3,700 |
| Elongation at break, % | 700 |
| 300% modulus, psi | 530 |
| Set at break, % | 40 |

Mill processability of the blends at 200° C was good to excellent.

We claim as our invention:

1. A composition comprising:
   a. 100 parts by weight of a first block copolymer of the group consisting of block copolymers of monoalkenyl arenes and conjugated dienes, and hydrogenated derivatives thereof; and
   b. 1-100 parts by weight of a second block copolymer of the group consisting of copolymers having at least one monoalkenyl arene polymer block and at least one epoxidized conjugated diene polymer block wherein the double bond content of the diene polymer block is reduced at least 10 percent by epoxidation said first and second block copolymer having the general configuration

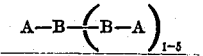

in which A is a polymer of a monoalkenyl arene and B is a polymer of a conjugated diene.

2. A composition according to claim 1 wherein the block copolymer a) has at least one conjugated diene polymer block which has been hydrogenated to reduce at least about 90 percent of its olefinic unsaturation.

3. A composition according to claim 2 wherein the block copolymer b) has at least one epoxidized conjugated diene polymer block which has been hydrogenated to reduce at least about 50 percent of its olefinic unsaturation.

4. A composition according to claim 2 comprising:
   a. a block copolymer having at least two independently selected polystyrene blocks and at least one conjugated diene block hydrogenated to reduce at least about 90 percent of its olefinic unsaturation; and
   b. a second block copolymer having at least two polystyrene blocks and at least one epoxidized polybutadiene block wherein at least about 50 percent of the olefinic double bonds have been reduced by hydrogenation.

5. A composition according to claim 1 wherein the epoxidized diene polymer block also bears hydroxyl substituents.

* * * * *